US009135735B2

United States Patent
Leazenby et al.

(10) Patent No.: US 9,135,735 B2
(45) Date of Patent: Sep. 15, 2015

(54) TRANSITIONING 3D SPACE INFORMATION TO SCREEN ALIGNED INFORMATION FOR VIDEO SEE THROUGH AUGMENTED REALITY

(71) Applicant: QUALCOMM Incorporated, San Diego, CA (US)

(72) Inventors: Scott A. Leazenby, San Diego, CA (US); Eunjoo Kim, San Diego, CA (US); Per O. Nielsen, Chula Vista, CA (US); Gerald V. Wright, Jr., Cardiff, CA (US); Erick Mendez Mendez, Vienna (AT); Michael Gervautz, Vienna (AT)

(73) Assignee: QUALCOMM Incorporated, San Diego, CA (US)

(*) Notice: Subject to any disclaimer, the term of this patent is extended or adjusted under 35 U.S.C. 154(b) by 218 days.

(21) Appl. No.: 13/795,438

(22) Filed: Mar. 12, 2013

(65) Prior Publication Data
US 2013/0342573 A1 Dec. 26, 2013

Related U.S. Application Data

(60) Provisional application No. 61/664,328, filed on Jun. 26, 2012.

(51) Int. Cl.
*G09G 5/00* (2006.01)
*G06T 11/60* (2006.01)
(Continued)

(52) U.S. Cl.
CPC ................ *G06T 11/60* (2013.01); *G06T 15/20* (2013.01); *G06T 19/006* (2013.01)

(58) Field of Classification Search
CPC ................ G06T 13/00–13/80; G06T 19/006
USPC .......................... 345/629–641, 475
See application file for complete search history.

(56) References Cited

U.S. PATENT DOCUMENTS 6,900,809 B2 * 5/2005 Qi .................................. 345/473
7,116,342 B2 * 10/2006 Dengler et al. ............... 345/630
(Continued)

FOREIGN PATENT DOCUMENTS

EP 1982862 A2 10/2008

OTHER PUBLICATIONS

Wendt et al., Markerless Outdoor Localisation Based on SIFT Descriptors for Mobile Applications, ICISP 2008, Lecture Notes in Computer Science 5099, 2008, pp. 439-446.*
(Continued)

*Primary Examiner* — Charles Tseng
(74) *Attorney, Agent, or Firm* — Hunter Clark PLLC (57) ABSTRACT

Methods, apparatuses, and systems are provided to transition 3D space information detected in an Augmented Reality (AR) view of a mobile device to screen aligned information on the mobile device. In at least one implementation, a method includes determining augmentation information associated with an object of interest, including a Modelview (M1) matrix and a Projection (P1) matrix, displaying the augmentation information on top of a video image of the object of interest using the M1 and P1 matrices, generating a second Modelview (M2) matrix and a second Projection (P2) matrix, such that the matrices M2 and P2 represent the screen aligned final position of the augmentation information, and displaying the augmentation information using the M2 and P2 matrices.

18 Claims, 8 Drawing Sheets

(51) Int. Cl.
*G06T 15/20* (2011.01)
*G06T 19/00* (2011.01)

(56) References Cited

U.S. PATENT DOCUMENTS

| | | |
|---|---|---|
| 7,663,649 B2 | 2/2010 | Takemoto et al. |
| 8,692,831 B2 * | 4/2014 | Yoon et al. .................... 345/475 |
| 2003/0210832 A1 | 11/2003 | Benton |
| 2004/0130550 A1 * | 7/2004 | Blanco et al. ................ 345/473 |
| 2010/0073366 A1 | 3/2010 | Tateno |
| 2011/0029903 A1 | 2/2011 | Schooleman et al. |
| 2011/0246276 A1 * | 10/2011 | Peters et al. ............... 705/14.24 |
| 2011/0310087 A1 | 12/2011 | Wright, Jr. et al. |
| 2011/0310227 A1 | 12/2011 | Konertz et al. |
| 2012/0114200 A1 | 5/2012 | Akhriev et al. |

OTHER PUBLICATIONS

Magnenat-Thalmann et al., Virtual Worlds and Augmented Reality in Cultural Heritage Applications, Recording, Modeling and Visualization of Cultural Heritage, Baltsavias et al. (editors), 2005, pp. 419-430.*

Anonymous: "Opengl—The purpose of Model View Projection Matrix—Stack Overflow," Apr. 5, 2011, XP055109687, p. 1.

International Search Report and Written Opinion—PCT/US2013/042557—ISAEPO—Apr. 2, 2014.

Nikobonyadrad S., "Augmented Reality for Product Packaging", An Android Augmented Reality App, Bachelor Thesis, Mid Sweden University, May 30, 2012, 37pgs.

* cited by examiner

TRANSITIONING 3D SPACE INFORMATION TO SCREEN ALIGNED INFORMATION FOR VIDEO SEE THROUGH AUGMENTED REALITY

CROSS-REFERENCE TO RELATED ACTIONS

This application claims the benefit of U.S. Provisional Application No. 61/664,328, entitled "Transitioning 3D Space Information to Screen Aligned Information for Video See Through Augmented Reality," filed on Jun. 26, 2012, which is assigned to the assignee hereof, and expressly incorporated herein by reference.

BACKGROUND

1. Field

The subject matter disclosed herein relates to electronic devices, and more particularly to methods, apparatuses, and systems for use in and/or with Augmented Reality (AR) environments for mobile electronic devices.

2. Information

Mobile computing devices (mobile devices) provide users with access to a variety of information via wireless communication systems. As an example, mobile devices enabled for use with wireless cellular networks and/or wireless local area networks such as Wi-Fi or WiMAX provide users with access to vast information resources of the Internet. Mobile devices may also enable users to explore augmented reality environments which provide a real-time view of a target object merged with, or augmented by, computer generated graphical content. For example, a camera residing on board a mobile device may be used in conjunction with a graphical display to present a user with supplemental information relating to targets of interest that are captured in a camera view of the mobile device. Such supplemental information may form an information layer that overlays real-world objects that are captured in a camera view of the mobile device. This functionality is generally referred to as Augmented Reality (AR) view mode. In an AR view, objects captured in the camera view can be transitioned to align with the display screen to allow a user easier access to the information layer.

In traditional applications, a device can have an AR mode view and AR information can be presented as augmentation on a target item which triggered the augmented content. In such applications, however, the AR information is often too detailed for a user to interact with while the mobile device is in the AR mode. In other applications, the augmented content is immediately presented in a non-AR mode (e.g., screen space) when the target object is detected. In such an application it is often difficult to determine which target object is associated with the augmented content.

SUMMARY

Implementations relating to transitioning of 3D space information detected in an Augmented Reality (AR) view to screen aligned information on a mobile device are disclosed. In at least one implementation, a method is provided that includes determining an augmented reality object based on an image of a target object captured by a mobile device, information associated with the target object is retrieved, augmentation information is displayed on top of the video image, and the augmentation information transitions from an AR view to a screen aligned position.

An example of a method of displaying augmentation information according to the disclosure includes determining augmentation information associated with an object of interest, including a Modelview (M1) matrix and a Projection (P1) matrix, displaying the augmentation information on top of a video image of the object of interest using the M1 and P1 matrices, generating a second Modelview (M2) matrix and a second Projection (P2) matrix, such that the matrices M2 and P2 represent the screen aligned final position of the augmentation information, and displaying the augmentation information using the M2 and P2 matrices.

Implementations of such a method may include one or more of the following features. Determining at least one transition matrix Mx and at least one transition matrix Px, such that Mx is an interpolation (M1, M2) and Px is an interpolation (P1, P2), and displaying the augmentation information using the matrices Mx and Px. The interpolation (M1, M2) and the interpolation (P1, P2) can be linear interpolations. The interpolation (M1, M2) and the interpolation (P1, P2) can be determined by functions such as acceleration, deceleration, and a curve. Augmentation information can correspond to a video patch of the object of interest. Augmentation information can correspond to an augmentation of the object of interest. The augmentation information can correspond to an alpha blended mix of a video patch and augmentation of the object of interest. An application associated with the object of interest can be displayed in a non-augmented view mode.

An example of a method for displaying augmentation information according to the disclosure include displaying an object of interest on a mobile device, determining augmentation information including a Modelview (M1) matrix and Projection (P1) matrix associated with the object of interest, displaying the augmentation information on top of an image of the object of interest using the M1 and P1 matrices, calculating a second Modelview (M2) matrix and a second Projection (P2) matrix, such that the M2 and P2 matrices represent the desired final position of the augmentation information, estimating a number of frames to use for a transition, determining a transition matrix Mx and a transition matrix Px for each frame of the transition, displaying the augmentation information in each frame using the Mx and Px matrices, displaying the final frame using the M2 and P2 matrices, and executing an application associated with the object of interest.

Implementations of such a method may include one or more of the following features. Determining the transition matrices Mx and Px can be based on an interpolation between M1 and M2, and P1 and P2 respectively. The interpolation can be linear, acceleration, deceleration, and/or a curve.

An example of an apparatus for displaying augmentation information according to the disclosure includes a mobile device with a graphical display configured to display an object of interest, a processor programmed with instructions to determine augmentation information associated with the object of interest, such that the augmentation information includes a Modelview (M1) matrix and a Projection (P1) matrix, display the augmentation information on top of a video image of the objection of interest using the M1 and P1 matrices, generate a second Modelview (M2) matrix and a second Projection (P2) matrix, such that the matrices M2 and P2 represent the screen aligned final position of the augmentation information, determine at least one transition matrix Mx and at least one transition matrix Px, such that Mx is an interpolation (M1, M2) and Px is an interpolation (P1, P2), and display the augmentation information using the matrices Mx and Px.

Implementations of such an apparatus may include one or more of the following features. An application associated with the object of interest can be executed after the augmentation information is displayed using the matrices M2 and P2. The transition matrices Mx and/or Px can be determined using an interpolation methods such as linear interpolation, acceleration, deceleration, and curved. Augmentation information that corresponds to a video patch of the object of interest can be displayed. Augmentation information that corresponds to an augmentation of the object of interest can be displayed. Augmentation information that corresponds to an alpha blended mix of a video patch and augmentation of the object of interest can be displayed.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Implementations relating to augmented reality environments are disclosed in a mobile computing context. Augmented reality authoring tools that are accessible via a mobile device enable mobile devices users to define an augmented reality environment and deploy media content such as images including photos or other graphical elements, videos, animations, text, and audio within that augmented reality environment. Media content that is deployed by a particular mobile device user may be accessed by other mobile device users that explore the augmented reality environment via their respective mobile devices.

Target objects such as magazine advertisements, billboards, documents, and other real-world 2D and 3D objects are captured in an AR view mode of a mobile device. Augmented reality information may be determined, for example, by application of object recognition techniques to obtain electronic representations of the target objects. Such electronic representations may comprise multiple (key) points with their associated descriptors obtained from the AR view of the target objects. Information layers supporting augmented reality environments may be defined by a mobile device user through application of one or more presentation regions and/or activation regions that may be attached to such electronic representations of extracted target objects.

A presentation region for a media content item may be deployed to an augmented reality environment by a user for the purpose of defining a location (e.g., a position and/or orientation) where the media content item is presented within that augmented reality environment. An activation region for a media content item may be deployed within an augmented reality environment by a user for the purpose of defining conditions for how and/or when the presentation of the media content item at an associated presentation region may be enabled and/or initiated responsive to user input and/or estimated mobile device position and/or orientation. An activation region can receive input gestures from a user to transition from the augmented reality environment to a non-augmented reality view (i.e., an application). The transition from the augmented reality environment to the non-augmented view can include transformation of the size, shape, and orientation of an object of interest and/or the corresponding AR object and/or a video patch associated with the object of interest or the AR object.

Figure 1:
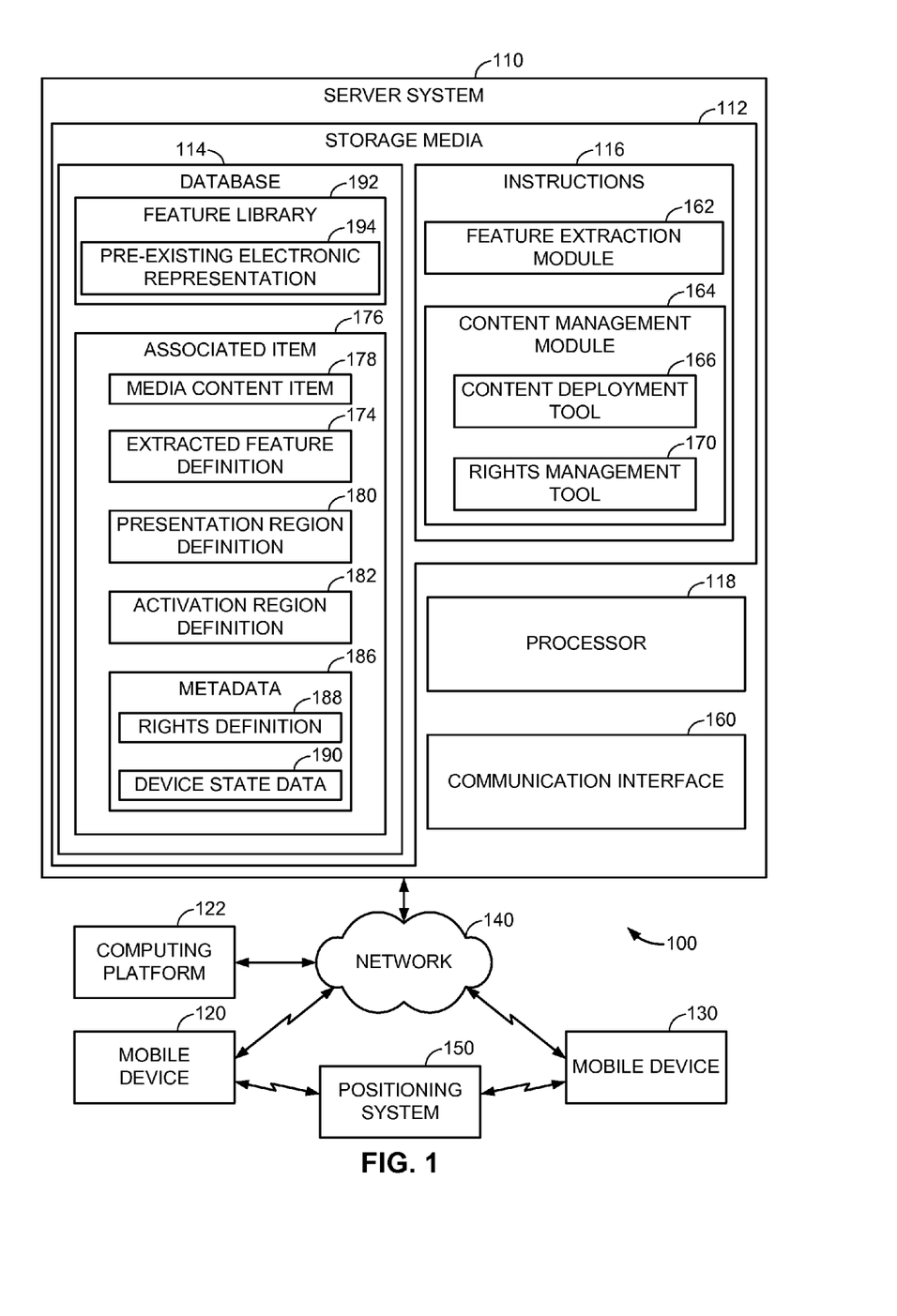
FIG. 1 is a schematic block diagram of an example network environment according to one implementation.

FIG. 1 is a schematic block diagram of an example network environment 100 according to one implementation. Network environment 100 may include any number of mobile devices such as, for example, mobile devices 120 and 130. Mobile devices 120 and 130 may communicate wirelessly with a server system 110 via network 140. Mobile devices 120 and 130 may comprise any suitable mobile computing platform, including a cellular phone, a smart phone, a personal digital assistant, a low duty cycle communication device, a laptop computer, a portable media player device, a personal navigation device, and a portable electronic device comprising a digital camera, to name a few examples. Network environment 100 may further include non-mobile computing platforms such as computing platform 122 that may also communicate with server system 110 via network 140. In at least some implementations, a mobile device may be adapted to communicate by docking with computing platform 122 by wired or wireless communication, for example, without utilizing network 140.

Network 140 may comprise one or more of a wide area network (e.g., the Internet), a local area network (e.g., an intranet), and/or a personal area network. For example, mobile devices 120 and 130 may communicate wirelessly with server system 110 via any suitable communication protocol, including cellular communication protocols such as CDMA, GSM, or WCDMA and/or wireless local area network (WLAN) protocols such as Wifi or WiMAX. Accordingly, network 140 may include one or more wireless transceivers in such implementations. Wireless transceivers of network 140 may also be utilized by mobile devices 120 and 130 to obtain positioning information for estimating mobile device position.

In some implementations, a trilateration based approach may be utilized by a mobile device to estimate geographic position. For example, techniques including Advanced Forward Link Trilateration (AFLT) in CDMA or Enhanced Observed Time Difference (EOTD) in GSM or Observed Time Difference of Arrival (OTDOA) in WCDMA may be used, which measures at a mobile device the relative times of arrival of wireless signals transmitted from each of several transmitter equipped base stations. As another example, a mobile device may estimate its position by obtaining a Media Access Control (MAC) address or other suitable identifier associated with a wireless transceiver and correlating the MAC address or identifier with a known geographic location of that wireless transceiver.

Mobile devices 120 and 130 may further obtain wireless positioning signals from a positioning system 150 to estimate mobile device position. For example, positioning system 150 may comprise a Satellite Positioning System (SPS) and/or a terrestrial based positioning system. Satellite positioning systems may include, for example, the Global Positioning System (GPS), Galileo, GLONASS, NAVSTAR, GNSS, a system that uses satellites from a combination of these systems, or any SPS developed in the future. As used herein, an SPS will also be understood to include pseudolite systems. It should be understood, however, that particular positioning techniques provided here are merely example positioning techniques, and that claimed subject matter is not limited in this respect.

Server system 110 may comprise one or more servers and/or other suitable computing platforms. Accordingly, server system 110 may include storage media 112 having database 114 and instructions 116 stored thereon. Server system 110 may include one or more processors such as example processor 118 for executing instructions 116 and/or for facilitating storage and retrieval of data at database 114. Server system 110 may further include a communication interface 160 for facilitating communication with clients of network 140, including mobile devices 120 and 130, and computing platform 122.

To facilitate understanding of the disclosed implementations, instructions 116 may be at times described in terms of one or more modules for performing particular operations. As one example, instructions 116 may include a feature extraction module 162 to extract features of target objects captured in the AR view mode of a mobile device. As another example, instructions 116 may include a content management module 164 to manage the deployment of media content within an augmented reality environment. Content management module 164 may include a number of tools to enable a user (e.g., a human user) to interact with the content management module, for example, via a mobile device (e.g., mobile device 120) or other suitable computing platform (e.g., computing platform 122). In at least some implementations, content management module 164 may include a content deployment tool 166 to enable a user to deploy media content within an augmented reality environment, and a rights management tool 170 to enable a user to manage access rights of other users to media content that has been deployed by that user. Such tools may be accessible to a user via input or output devices of a mobile device or other suitable computing platform. For example, a graphical user interface (GUI) presented at a graphical display of a mobile device may enable a user to define an augmented reality environment comprising one or more media content items by using one or more of tools 166, and 170.

Database 114 may include a variety of data, including one or more associated items such as example associated item 176. Associated item 176 may include, for example, at least one media content item 178 and other associated data elements, including for example: a presentation region definition 180, an activation region definition 182, metadata 186, and an extracted feature definition 174. Database 114 may further include a feature library 192 having one or more pre-existing electronic representations of real-world two- and three-dimensional features such as example pre-existing electronic representation 194.

Presentation region definition 180 may define a location relative to an extracted feature of a target object (e.g., as represented by extracted feature definition 174) where media content (e.g., media content item 178) may be presented within an augmented reality environment. Presentation region definition 180 may be defined by a user via content deployment tool 166.

Activation region definition 182 may define how and/or when the presentation of media content at a presentation region (e.g., as defined by presentation region definition 180) may be enabled or initiated responsive to user input and/or estimated position and/or orientation of a mobile device. Activation region definition 182 may be defined by a user via content deployment tool 166. For example, a user may utilize content deployment tool 166 to create activation region definition 182 that defines an activation region for an associated media content item (e.g., media content item 178).

Metadata 186 may include a rights definition 188 defining rights of users to access deployed media content items such as associated media content item 178. In some implementations, a user may use rights management tool 170 to create rights definition 188 for associated media content item 178. As a non-limiting example, a user may exclude select users from accessing a particular media content item, or a user may grant select users the right to access a particular media content item within an augmented reality environment.

Metadata 186 may further include device state data 190 that is associated with media content item 178. Device state data 190 may indicate a position and/or orientation of a mobile device, for example, while the mobile device is capturing the associated media content item. In some implementations, a position of a mobile device may be represented as one or more latitude, longitude, and/or altitude values measured relative to a reference datum. Similarly, orientation of a mobile device may be represented by one or more roll, pitch, and/or yaw values measured relative to a reference datum. A reference datum with respect to such orientation values may be defined, for example, as an axis of a line of sight of a camera of the mobile device. Such device state data may be based upon one or more positioning signals and/or inertial sensor measurements that are obtained at the mobile device as will be described in greater detail with reference to FIG. 2.

Figure 2:
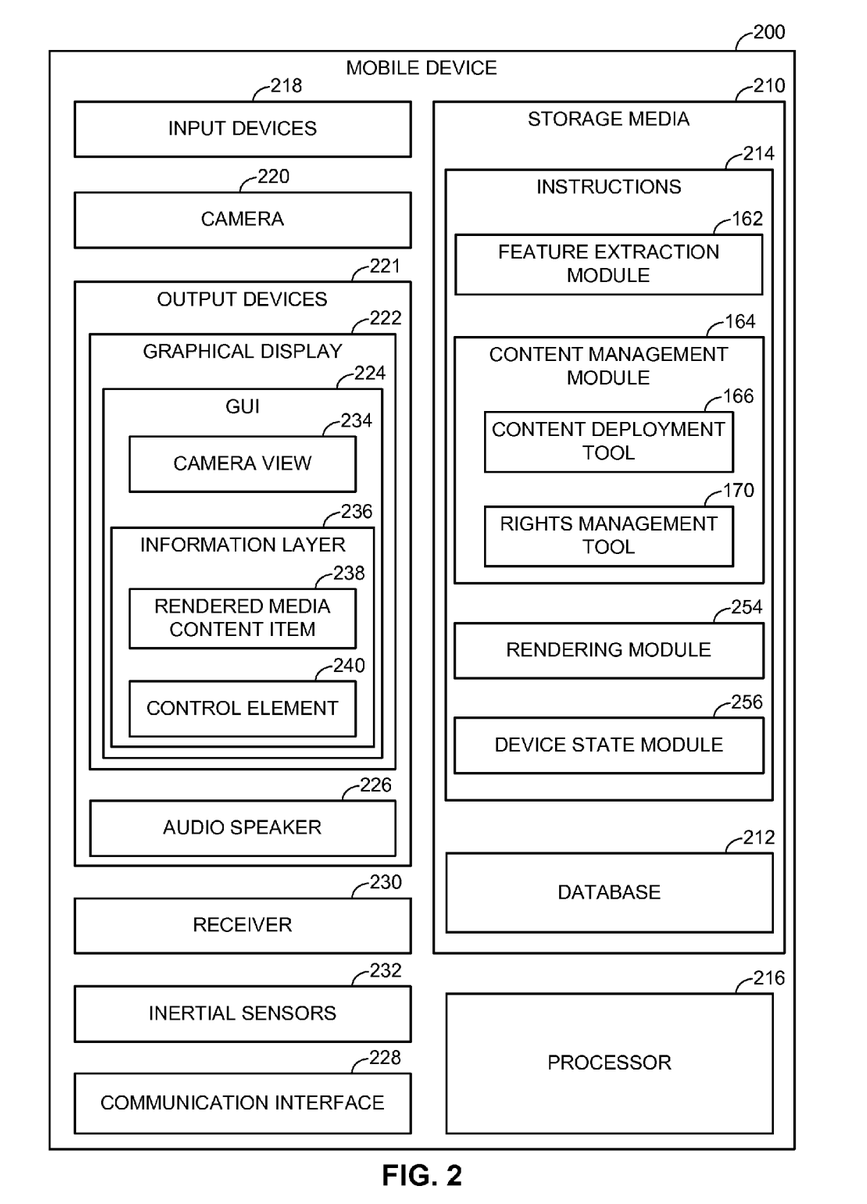
FIG. 2 is a schematic block diagram of an example mobile device according to one implementation.

FIG. 2 is a schematic block diagram of an example mobile device 200 according to one implementation. Mobile device 200 may serve as a non-limiting example of mobile devices 120 and 130 of FIG. 1 for at least some implementations. Accordingly, mobile device 200 may include a communication interface 228 to facilitate communication with other computing platforms, such as server system 110, mobile devices 120, 130 and/or computing platform 122 of FIG. 1, for example. Hence, communication interface 228 may enable wireless communication with communication networks including example network 140. Mobile device 200 may further include a receiver 230 to receive positioning signals from a positioning system such as example positioning system 150, for example.

Mobile device 200 may include input devices 218 to receive user inputs. Input devices 218 may include, for example, one or more physical buttons, keyboards, controllers, microphones, pointing devices, and/or touch-sensitive surfaces, for example. Mobile device 200 may include output devices 221 to present information to a user. As one example, output devices 221 may include a graphical display 222 to present a graphical user interface 224. In general, the graphical display 222 may comprise a touch-sensitive graphical display (e.g., a touch screen) capable of receiving user input. A touch-sensitive graphical display may utilize any suitable sensing technique for detecting user input at or near a display surface, including capacitive sensing, resistive sensing, and/or optical sensing techniques, for example. In such touch-sensitive implementations, graphical display 222 may serve as both an input device for receiving user input and an output device for presenting graphical content. Output devices 221 may further include an audio speaker 226 for presenting audio content in some implementations.

In at least some implementations, a graphical user interface (GUI) 224 may be presented at graphical display 222. GUI 224 may comprise one or more of a camera view 234 obtained via camera 220 and an information layer 236. Information layer 236 may comprise one or more rendered media content items such as rendered media content item 238 and one or more graphical control elements such as graphical control element 240. As a non-limiting example, rendered media content item 238 may correspond to a rendered state of media content item 178 such as an image, a video, an animation, among other suitable graphical content or a portion thereof. Graphical control element 240 may include one or more graphical elements for enabling a user to provide user input for controlling functionality of the mobile device.

Mobile device 200 may include one or more inertial sensors 232 to obtain inertial sensor measurements on-board the mobile device. In at least some implementations, inertial sensors 232 may comprise one or more accelerometers, gyroscopes, or other suitable devices for measuring an inertial state of a mobile device. In some implementations, an inertial state of a mobile device may be measured by inertial sensors 232 along multiple axes in Cartesian and/or polar coordinate systems to provide an indication of position and/or orientation of the mobile device.

It will be appreciated that inertial sensor measurements obtained from inertial sensors 232 may be processed (e.g., integrated over time) to obtain such estimates of mobile device position and/or orientation. As previously described, a position of a mobile device may be represented as one or more latitude, longitude, and/or altitude values and an orientation of a mobile device may be represented by one or more roll, pitch, and/or yaw values measured relative to a reference datum. Mobile device 200 may include a camera 220 to obtain a camera view 234 which may be presented at graphical display 222. Camera 220 may comprise a digital camera in some implementations having a number of optical elements including one or more lenses for focusing light and/or one or more light sensing elements for converting light into digital signals representative of image and/or video data. As a non-limiting example, a light sensing element may comprise an optical pickup, charge-coupled device and/or photoelectric device for converting light into digital signals. Digital signals obtained from one or more light sensing elements of the camera may be processed and/or rendered at graphical display 222 as camera view 234. Furthermore, in some implementations, a camera view obtained via camera 220 may be stored at storage media as image and/or video content. For example, digital signals obtained from camera 220 may be encoded and stored at storage media 210 as .jpeg, .mpeg, or other suitable format. Such digital signals representative of a camera view may be transmitted to other computing platforms for storage and/or processing. For example, a camera view obtained at a mobile device may be transmitted to a server system or other suitable computing platform via a communication network or by docking with another computing platform.

Mobile device 200 may further include storage media 210 having a database 212 and instructions 214 stored thereon. Mobile device 200 may include one or more processors such as example processor 216 for executing instructions 214 and/or facilitating storage and retrieval of data at database 212. Database 212 may include a variety of data, including some or all of the data elements previously described with reference to database 114 of FIG. 1. For example, database 212 may retain locally at mobile device 200, one or more of associated content item 176 and feature library 192, among other data. It will be appreciated that such data may also be retained remotely, for example, at a server system such as server system 110 of FIG. 1 where it may be accessed by the mobile device via a wireless network.

Instructions 214 may similarly include one or more of the previously described modules and/or tools of instructions 116 of FIG. 1. For example, instructions 214 may include previously described feature extraction module 162 and content management module 164 retained locally at mobile device 200. Instructions 214 may further include rendering module 254 to facilitate rendering and/or presentation of GUI 224 at graphical display 222. Instructions may further include a device state module 256 for processing positioning signals obtained via receiver 230 and/or inertial sensor measurements obtained via inertial sensors 232. For example, device state module 256 may be adapted to estimate a position and/or orientation of mobile device 200 based, at least in part, on such positioning signals and/or inertial sensor measurements. An estimated position and/or orientation of mobile device 200 may be stored at database 212, for example, as previously described with reference to device state data 190. In at least some implementations, device state module 256 may be adapted to obtain device state data for a mobile device responsive to the capture of a media content item at the mobile device. For example, an image captured at mobile device 200 via camera 220 may cause device state module 256 to estimate a position and/or orientation of the mobile device at or near a time that the image was captured. Device state module 256 may be further adapted to associate the device state data with that media content item (e.g., as metadata), for example, at database 212 or database 114.

Furthermore, in at least some implementations, digital signals representative of an AR view obtained via camera 220 may be captured as a static image or a dynamic video. Such digital signals may be processed by feature extraction module 162 to obtain an electronic representation (e.g., a model) of real-world features captured within the AR view. Such electronic representations of real-world features may be stored at database 212 and/or database 114 as extracted feature definition 174 where it may be associated with one or more media content items such as media content item 178, for example.

It will be appreciated that at least some elements of the example mobile device 200 of FIG. 2 may be present in other mobile or non-mobile computing platforms such as computing platform 122 of FIG. 1 to enable such computing platforms to perform one or more of the operations, processes, and methods described herein. For example, computing platform 122 of FIG. 1 may comprise storage media such as storage media 210 including instructions 214 and/or database 212, one or more processors such as processor 216, one or more input and output devices, and a communication interface such as communication interface 228.

Figure 3:
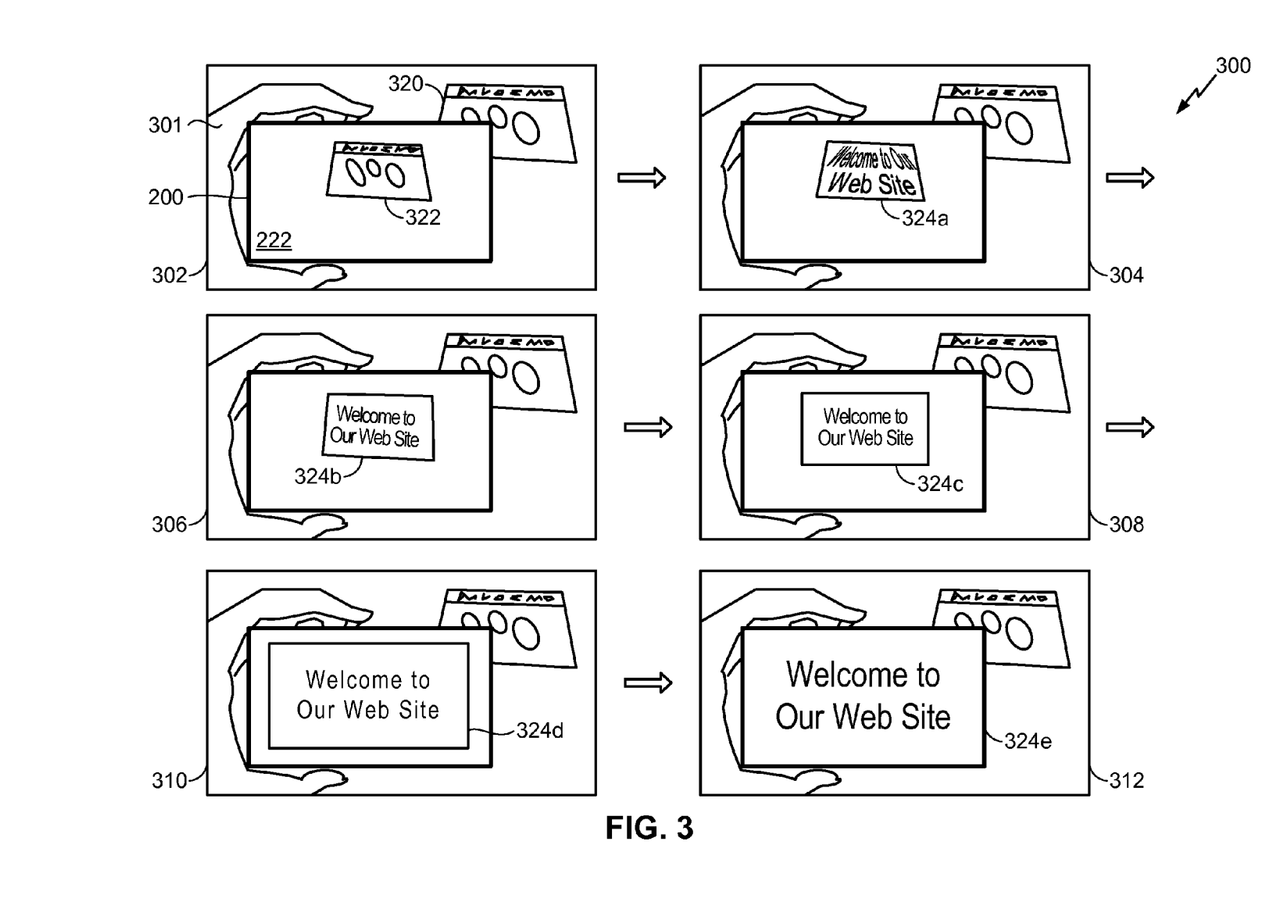
FIG. 3 is an exemplary illustration of the transition of an augmentation object from an AR view mode to a screen aligned view.

Referring to FIG. 3, an exemplary illustration 300 of the transition of an augmentation object from an AR view mode to a screen aligned view is shown. The sequence of images 302, 304, 306, 308, 310, 312 illustrates the display and functionality presented to a user 301 via the display screen 222 of an exemplary mobile device 200. In the first image 302 the user 301 is holding the mobile device 200 in their left hand. The camera of the mobile device 200 is directed at an object of interest 320 (e.g., a target), and an image of the object of interest 322 is displayed on the screen 222. In an embodiment, the mobile device 200 is configured to recognize the image 322 via the stored instructions 214 (i.e., feature extraction module 162). The object of interest image 322 is recognized by the AR system, and augmentation information associated with the image 322 can be retrieved (e.g., from the mobile device 200 or from the server system 110). For example, the augmentation information can be a 3D model to augment and the size and shape of the object of interest 320. In an embodiment, this information can include Modelview (M1) and Projection (P1) matrices for the augmentation.

In the next image 304, the image of the object of interest 322 is transformed based on the augmentation information to an augmentation object 324a. In this example, the augmentation 324a is a "Welcome to Our Web Site" billboard. The dimensions and orientation of the augmentation 324a can align with the image of the object of interest 322. For example, the augmentation 324a is associated with the object of interest 320 and is displayed on top of the video image 322 using matrices M1 and P1.

The mobile device 200 can receive the user input such as a screen tap, a screen swipe, a voice command, or a shake, and a new set of matrices M2 and P2 can be generated. Other events (e.g., system or user activated) can be used to generate the new set of matrices M2 and P2. These new matrices can describe the final, screen aligned, desired position of the augmentation 324b. For example, referring to the next images 306, 308, the augmentation 324c is rotated in 3D space to appear orthogonal to the viewing screen 222. The event triggers a transition between the M1-M2 and P1-P2 matrices. As depicted in the subsequent images 308, 310, 312, the augmentation 324c continues the transition from the 3D position to one or more mid-transitions 324d to the final screen aligned position 324e. The full screen appearance of the final screen aligned position 324e is exemplary only, and not a limitation. A final screen aligned position can be less than a full screen (e.g., as depicted in 324d for example). The final image 312 shows the mobile device 200 operating in a non-AR mode where the image of the final screen aligned position 324e can be an interactive application such as a web browser (i.e., displaying pages of associated with the "Welcome to Our Web Site" website). Other non-AR mode applications can also be used at the end of the transition (e.g., telephone, mapping, games, word processing, etc. . . . ).

As an example, and not a limitation, the transition can be performed with an interpolation method. For example, upon every frame an interpolation between M1-M2 and P1-P2 can be computed. In general, the transition matrices for frame X are defined as Mx=Interpolation (M1,M2) and Px=Interpolation(P1,P2). The number of frames required to complete the interpolation is implementation dependent. The interpolation method (i.e., Interpolation(i,j)) can also vary according to the implementation. For example, the interpolation can be linear, acceleration, deceleration or a curve. The initial position of the augmentation is defined by the M1 and P1 matrices. Other interpolation functions may also be used. The subsequent position upon every frame is given by the Mx, Px transition matrices. The final position of the augmentation is defined by the M2 and P2 matrices.

In an embodiment, other coordinate systems and dynamic start and end points may be used. The transition can utilize a coordinate system that uses the object of interest 320 as a reference. The matrices M1 and M2 can be defined relative to the initial location of the object of interest 320. The M1 and P1 matrices can change over time (e.g., as a result of tracking changes). The M2 and P2 matrices can also change over time. The matrices Mx and Px can be computed by interpolating the current values of M1-M2 and P1-P2 respectively.

Figure 4:
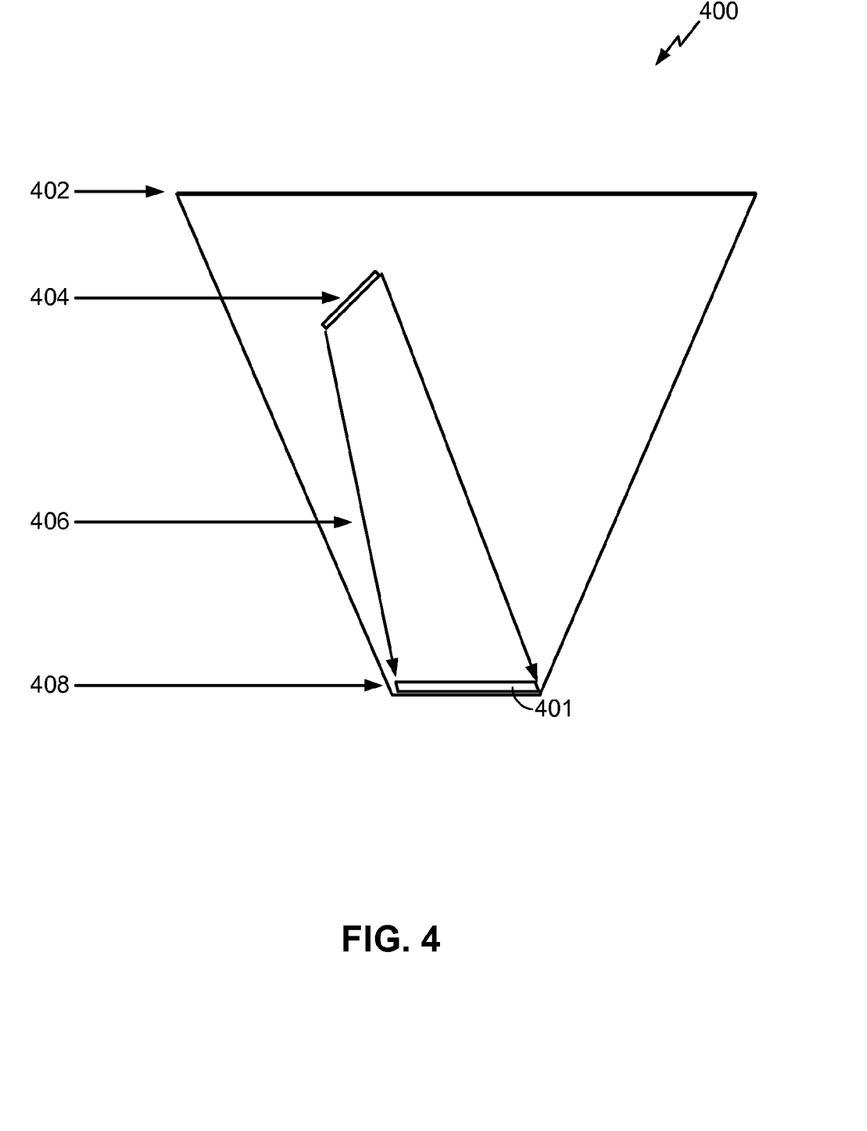
FIG. 4 is a top down illustration of the transition from an AR view mode to a screen aligned view of an augmentation.

Referring to FIG. 4, with further reference to FIG. 3, a top down illustration 400 of the transition from an AR view mode to a screen aligned view of an augmentation is shown. The illustration 400 is generally referred to as a viewing frustum and includes a front 401, a video background 402, an initial position of augmentation (e.g., 3D object) 404, a transitioning path of motion 406, and a desired final position of the augmentation 408. In general, trapezoidal volume in the illustration 400 is a conceptual tool to describe the closest and farthest things which can be displayed (e.g., the front 401 and the video background 402 respectively). In an embodiment, the initial position of the augmentation 404 can represent the initial size, relative location and orientation of an object of interest 322, and then the corresponding augmentation 324a. As an example, after a triggering event (e.g., tap, swipe, or other system activated trigger) the augmentation 324a transforms along the transitioning motion path 406 to the desired final position of the augmentation 408. The transition motion path 406 can also be curved. For example, the transformation path can be adjusted or recalculated based on the relative positions of the mobile device 200 and the object of interest 320. The transformation path may also be adjusted based on inertial sensors 232 in the mobile device 200. Thus, the transitioning motion path 306 can compensate as the object of interest 320, and the corresponding augmentation 324a, move across the display 222 (e.g., when the user pans the mobile device). In an embodiment, when the augmentation reaches the desired final position of the augmentation 408, the mobile device displays information associated with the object of interest 320 in a non-AR mode.

Figure 5:
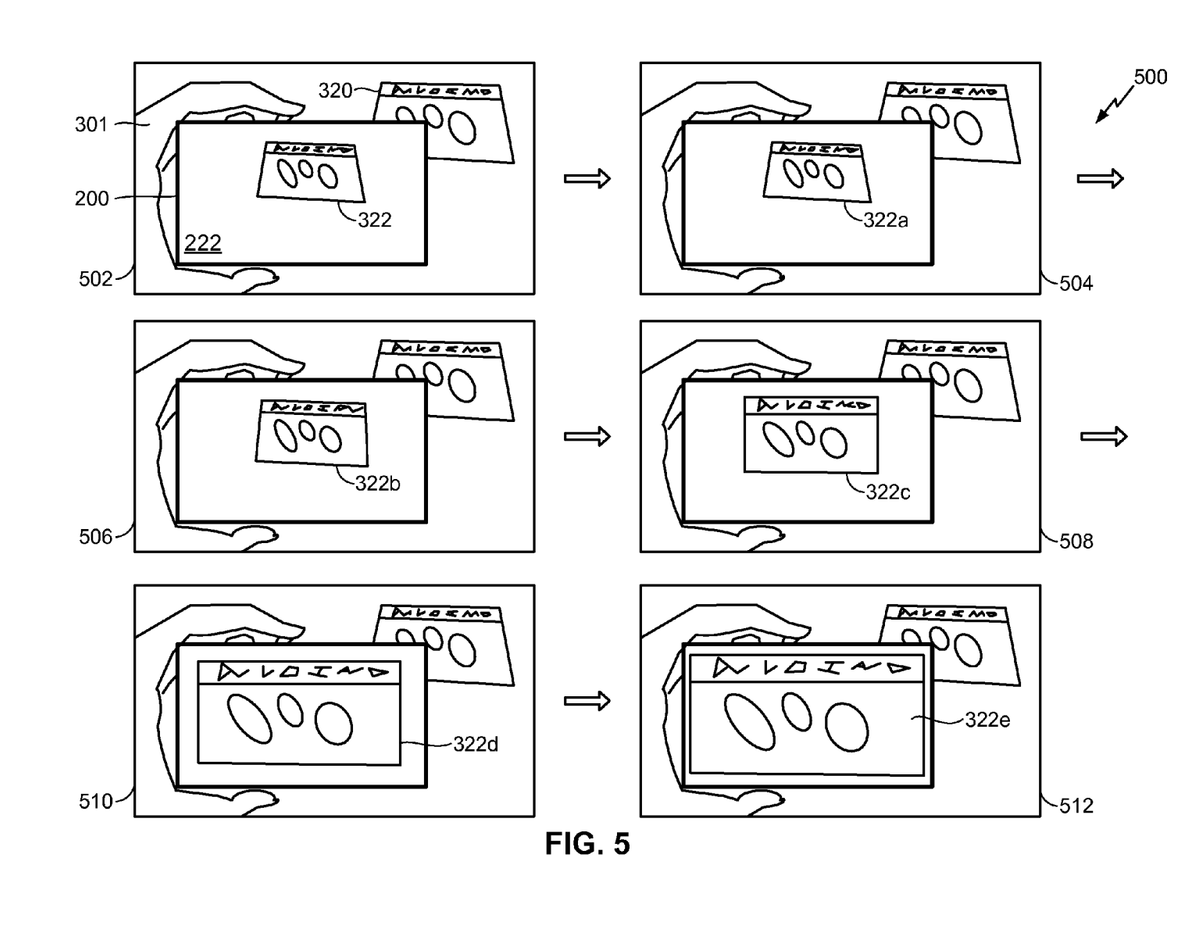
FIG. 5 is an exemplary illustration of the transition of a video patch from an AR view mode to a screen aligned view.

Referring to FIG. 5, with further reference to FIG. 3, an exemplary illustration 500 of the transition of a video patch from an AR view mode to a screen aligned view. In the first image 502, the user 301 points the camera of the mobile device 200 toward an object of interest 320. A video image of the object of interest 322 is displayed on the screen 222. In an embodiment, the mobile device 200 includes an AR view mode and is configured to recognize the image 322 via the stored instructions 214 (i.e., feature extraction module 162). The object of interest image 322 is recognized by the AR system, and augmentation information associated with the image 322 can be retrieved (e.g., from the mobile device 200 or from the server system 110). The augmentation information can define, for example, the size and shape of the object of interest 320 and can include the Modelview (M1) and Projection (P1) matrices for a virtual object which represents the object of interest 320. In the next image 504, the video patch 322b of the object of interest 320 is displayed (i.e., as compared to the augmentation 324a illustrated in image 304).

Referring to the next image 506, after a triggering event (i.e., user input, system trigger), a new set of matrices M2 and P2 can be generated. These new matrices can describe a final, screen aligned, desired position of the object of interest. The patch 322a can represent a video image of the object of interest 320. In an embodiment, the patch 322a can be a type of augmentation derived from the video image 322. A transition between the M1-M2 and P1-P2 can be triggered. Referring to the subsequent images 508, 510, 512, transitions from the position of the original video patch 322b (i.e., of the object of interest 320) to the screen aligned position of the video patch 322e can be determined. For example, upon every frame, an interpolation between M1-M2 and P1-P2 can be computed. The matrices for frame X can be defined as Mx=Interpolation(M1,M2) and Px=Interpolation(P1,P2). The number frames that it takes to complete the interpolation can be implementation dependent. The interpolation method (i.e., Interpolation(i,j)) can vary. As examples, and not limitations, the interpolation can be linear interpolation, acceleration, deceleration or a curve. The initial position of the video patch 322a can be defined by the M1 and P1 matrices. The subsequent position upon every frame can be given by the Mx, Px transition matrices. The final position of the video patch 322e can be defined by the M2 and P2 matrices. The M2 and P2 matrices are not limited to a full screen mode (i.e., they can represent a smaller portion of the screen area). In an embodiment, the transformations can be decomposed in multiple steps. For example, a transformation can begin with the rotational information of M1 and M2, followed by scale and translation. In an example, the interpolation of M1-M2 and P1-P2 can be performed in sequential order rather than simultaneously. In another example the modelview and projection matrices can be combined into a single matrix S1=M1*P1 and S2=M2*P2 respectively from which the interpolations Sx=Interpolation(S1,S2) occur.

Figure 6:
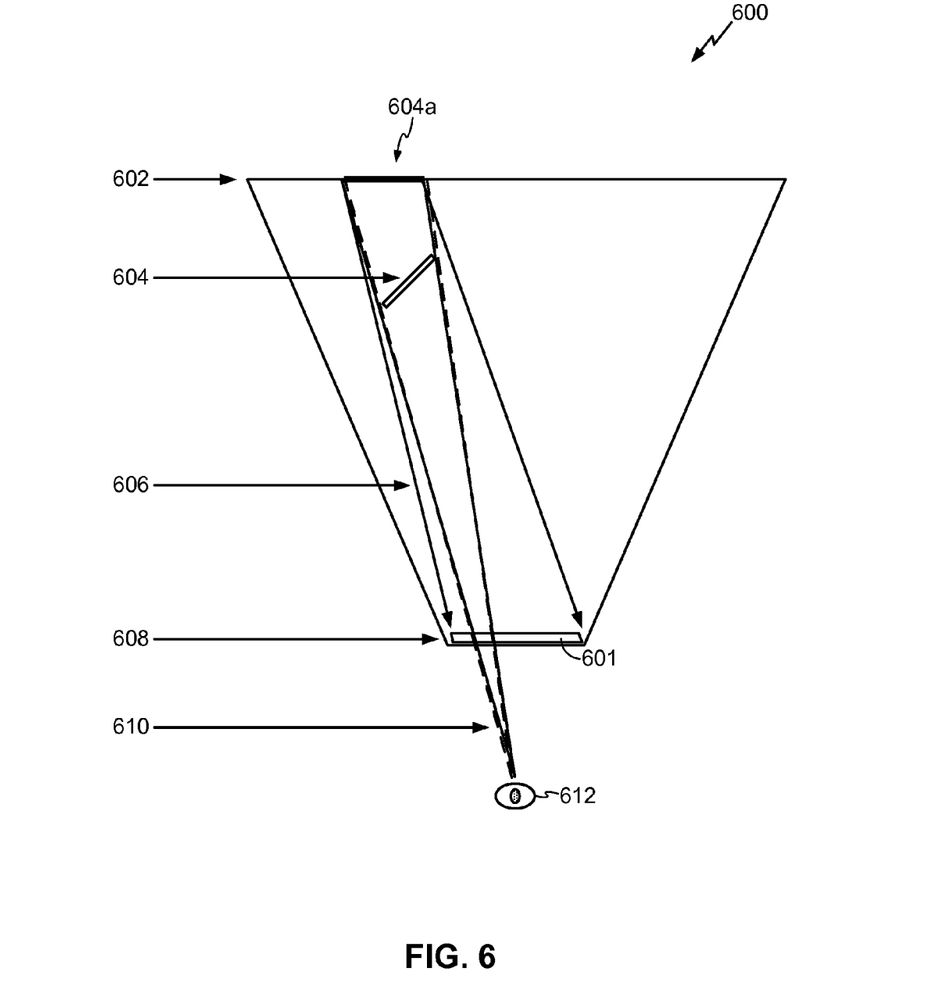
FIG. 6 is a top down illustration of the transition from an AR view mode to a screen aligned view of a video patch.

Referring to FIG. 6, with further reference to FIG. 5, a top down illustration 600 of the transition from an AR view mode to a screen aligned view of a video patch is shown. The illustration 600 includes a viewing frustum with a front 601, a video background 602, an initial position of a augmentation 604, a projection of the augmentation on the video background 604a (i.e., a video patch), a transitioning motion path 606, a desired final position of the video patch 608, projection lines used to calculate the video patch of the augmentation 610, and an observer 612. In this example, the augmentation 604 is not rendered on the screen 222, but it is used to determine the video patch 604a. That is, the video patch 604a is a projection of the initial augmentation 604 onto the video background. The transition is then determined based on video patch 604a. The video patch 604a is transformed along the transitioning motion path 606 to desired final position of the video patch 608. As previously described, the transition motion path can be curved (e.g., based on the relative position between the object of interest 320 and the camera 220, or other sensors 232 within the mobile device 200).

Figure 7:
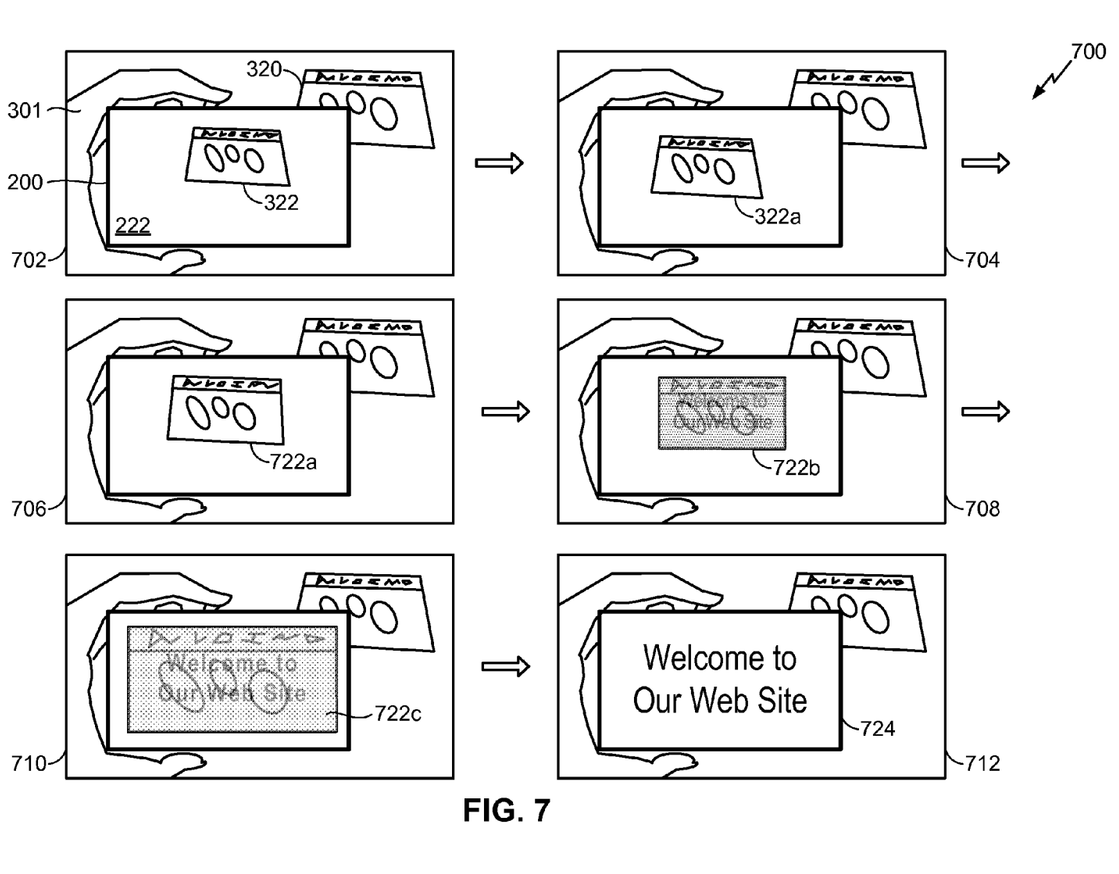
FIG. 7 is an exemplary illustration of a dual transition of an object from an AR view mode to a screen aligned mode with a different media representation.

Referring to FIG. 7, with further reference to FIGS. 3 and 5, an exemplary illustration 700 of a dual transition of an object from an AR view mode to a screen aligned mode is shown. In the first image 702, the user 301 points the camera 220 of the mobile device 200 toward an object of interest 320. A video image of the object of interest 322 is displayed on the screen 222. In an embodiment, the mobile device 200 includes an AR view mode and is configured to recognize the image 322 via the stored instructions 214 (i.e., feature extraction module 162). The object of interest image 322 is recognized by the AR system, and augmentation information associated with the image 322 can be retrieved (e.g., from the mobile device 200 or from the server system 110). In the next image 704, the video patch 322a of the object of interest 320 is displayed. In the next image 706, a transition between the position information and the media representation begins. An event (i.e., user tap, swipe, shake, or other system event) can be used to initiate the transition. In an example, the first media representation can be the video patch 322a and the second media presentation can be the augmentation of the object of interest (e.g., the Welcome to Our Web Site billboard augmentation 324a). The location and orientation of the media representations can be coextensive. For example, a transition object 722a can include the media representations with varying opacity factors on the screen 222 (e.g., the opacity of one can be increasing, while the other is decreasing).

In the subsequent images 708, 710, the size and orientation of the transition object 772a can be varied according to a transitioning path (e.g., linear interpolation, acceleration, deceleration or a curve), and the opacity of the media representations can be based on image parameters associated with the media (e.g., color scheme, contrast, brightness). The transition from the 3D position of the original video patch 322a to the screen aligned position 724 can be calculated in a variety of ways. For example, upon every frame an interpolation between the two positions can be computed. A transition between a first media representation and a second representation can also be computed. The number of frames required to complete the transitions can be implementation dependent. The spatial and media transition method can also vary according to the implementation. In an example, the transition can be alpha blending. That is, the initial form of representation is the video patch, and the final form of representation is the "Welcome to our Website" billboard. The frames in between the beginning and end transitions present an alpha blended mix of the two media.

At the conclusion of the transition, as seen in image 712, a non-AR view in a screen aligned position 724 of an application is presented to the user.

In an embodiment, the augmentation and video patch information can transition back from the non-AR view mode into a camera coordinate space when the user has completed their interaction (e.g. by pressing a Close (X) button) by turning on the camera while the augmentation is still full screen, reacquiring the object of interest 320 and performing the transition in reverse. If the object of interest 320 is no longer in view, the augmentation can perform a pre-stored transition (e.g., shrink while translating backwards to a horizontal position, continuing to shrink until it disappears), or perform a compromise transition to the new AR view (e.g., shrink while translating to the angle of a newly recognized plane in the AR mode, then continuing to shrink until it disappears). Other reverse transitions can be performed.

Figure 8:
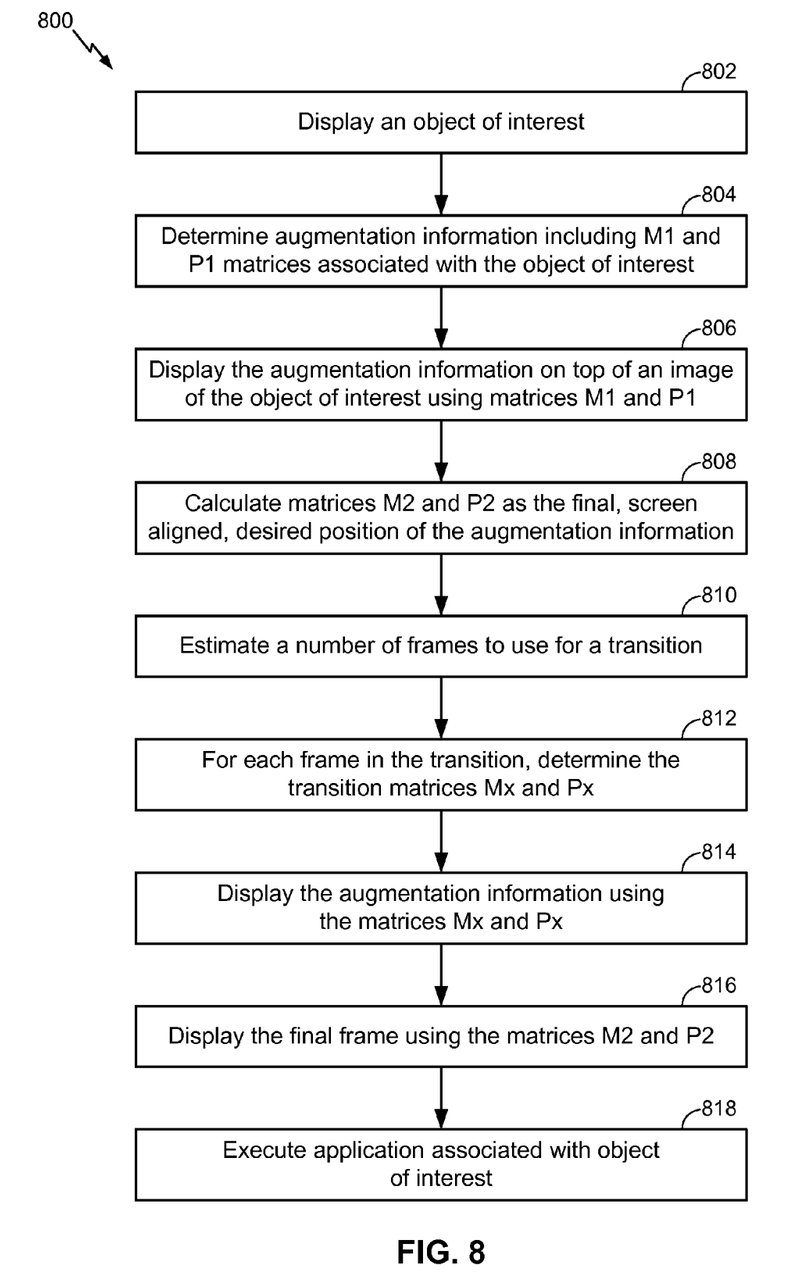
FIG. 8 is a process diagram for a translation of an augmentation from a 3D space to screen aligned space.

In operation, referring to FIG. 8, with further reference to FIGS. 3-7, a process 800 for translating an augmentation from 3D space to screen aligned space using the mobile device 200 includes the stages shown. The process 800, however, is exemplary only and not limiting. The process 800 may be altered, e.g., by having stages added, removed, or rearranged.

At stage 802 an object of interest can be displayed on a mobile device 200. For example, a user 301 can direct the camera 220 of the mobile device 200 to an object of interest 320. The mobile device can be configured to operate in an AR view mode. In general, the object of interest 320 is a real world object such as a billboard, sign, magazine advertisement, or other object which can be viewed. In an embodiment, the object of interest is not detected visually but is received via other sensors on the mobile device 200. For example, augmentation information associated with a physical location can be provided to the mobile device via a wireless network. Thus, in this example, the physical location is the object of interest and the augmentation information can be displayed without sensing a visual target.

At stage 804, the mobile device 200 can determine augmentation information including the Modelview (M1) and Projection (P1) matrices that are associated with the object of interest. In an embodiment, an algorithm for determining augmentation information includes performing feature recognition on the object of interest and receiving the augmentation information to use. The augmentation information can be stored locally (e.g., within the database 212), or can be received from a remote server 110. The augmentation information can be an augmentation object (e.g., the Welcome to Our Web Site billboard), or a video patch of the object of interest, or a combination of both. The augmentation information can define, for example, the size and shape of the object of interest and can include the M1 and P1 matrices for a virtual object which represents the object of interest. At stage 806, the augmentation information can be displayed over the image of the object of interest using the M1 and P1 matrices. For example, referring to the first two images 302, 304 of FIG. 3, if the augmentation information is an augmentation object, then the augmentation object can appear on the display screen with a size and orientation that are similar to the size and orientation of the image of the object of interest.

At stage 808, the mobile device 200 can calculate a new set of matrices M2 and P2 which describe the final, screen aligned, desired position of the augmentation information. For example, the matrices M2 and P2 can be based on the visual dimensions of the augmentation information and the available display area or resolution of the graphical display 222. Other factors such as the orientation of the mobile device may be used to determine the desired screen alignment. At stage 810, a number of frames to use for the transition from M1-M2 and P1-P2 can be estimated. The simplest estimate can be two frames, but a higher number of frames may be used. For example, the number of frames can be based on the processing capability of the mobile device 200, the complexity of the augmentation information, and the resolution of the graphic display 222. In an embodiment, the number of frames to use is provided with the augmentation information, or is a fixed value. The number of frames to use may also be adjusted during the transition based on the relative positions of the object of interest 320 and the mobile device. For example, if the user pans the camera after a transition is initiated, the process can include a step to increase the number of frames as the transition tracks the relative motion of the object of interest.

At stage 812, the mobile device 200 determines a matrix Mx and Px for each frame of the transition. The number of frames in the transition need not be a fixed number as each subsequent transition matrix Mx and Px can be an interpolation from the previous matrix. A frame of the transition can be displayed before the subsequent matrices Mx and Px are determined. The transitioning motion path M1-M2, P1-P2 can be optimized based on processor capability, complexity of the augmentation information, mobile device motion, and other variables which can impact the efficiency of the solution. At stage 814, the augmentation information is displayed for a frame based on the computed Mx and Px matrices for that frame. As a result, from the user's perspective, the size, shape and/or orientation of the augmentation information will transition to the desired position with each new frame until the final frame is displayed at stage 816.

At stage 818, a non-AR application can be executed. In general, the non-AR application is associated with the object of interest 320. As an example, and not a limitation, an object of interest 320 can be a magazine advertisement and the non-AR application can be a web browser displaying the home page of the advertiser. Other object of interest and application combinations can be used.

Communication and data access techniques described herein may be implemented in conjunction with various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

The methodologies described herein may be implemented in different ways and with different configurations depending upon the particular application. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

The herein described storage media may comprise primary, secondary, and/or tertiary storage media. Primary storage media may include memory such as random access memory and/or read-only memory, for example. Secondary storage media may include mass storage such as a magnetic or solid state hard drive. Tertiary storage media may include removable storage media such as a magnetic or optical disk, a magnetic tape, a solid state storage device, etc. In certain implementations, the storage media or portions thereof may be operatively receptive of, or otherwise configurable to couple to, other components of a computing platform, such as a processor.

In at least some implementations, one or more portions of the herein described storage media may store signals representative of data and/or information as expressed by a particular state of the storage media. For example, an electronic signal representative of data and/or information may be "stored" in a portion of the storage media (e.g., memory) by affecting or changing the state of such portions of the storage media to represent data and/or information as binary information (e.g., ones and zeros). As such, in a particular implementation, such a change of state of the portion of the storage media to store a signal representative of data and/or information constitutes a transformation of storage media to a different state or thing.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels.

Unless specifically stated otherwise, as apparent from the following discussion, it is appreciated that throughout this specification discussions utilizing terms such as "processing," "computing," "calculating,", "identifying", "determining", "establishing", "obtaining", and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented computer-readable storage mediums such as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed via computer-readable instructions to perform particular functions pursuant to instructions from program software.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in some implementations" or other like phrases in various places throughout this specification are not necessarily all referring to the same feature, example, and/or limitation. Furthermore, the particular features, structures, or characteristics may be combined in one or more examples and/or features.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of appended claims, and equivalents thereof.

What is claimed is:

1. A method, comprising:
   displaying an object of interest on a mobile device;
   determining augmentation information including a Modelview (M1) matrix and Projection (P1) matrix associated with the object of interest;
   displaying the augmentation information on top of an image of the object of interest using the M1 and P1 matrices;
   calculating a second Modelview (M2) matrix and a second Projection (P2) matrix, wherein the M2 and P2 matrices represent the desired final position of the augmentation information;
   estimating a number of frames to use for a transition;
   determining a transition matrix Mx and a transition matrix Px for each frame of the transition;
   displaying the augmentation information in each frame using the Mx and Px matrices;
   displaying the final frame using the M2 and P2 matrices; and
   executing an application associated with the object of interest.

2. The method of claim 1, wherein determining the transition matrices Mx and Px is based on an interpolation between M1 and M2, and P1 and P2 respectively.

3. The method of claim 2, wherein the interpolation is selected from a group of methods consisting of linear, acceleration, deceleration, and a curve.

4. A non-transitory computer-readable storage medium, having stored thereon computer-readable instructions for transitioning space aligned information to screen aligned information, comprising instruction configured to cause at least one processor to:
   display an object of interest on a mobile device;
   determine augmentation information including a Modelview (M1) matrix and Projection (P1) matrix associated with the object of interest;
   display the augmentation information on top of an image of the object of interest using the M1 and P1 matrices;
   calculate a second Modelview (M2) matrix and a second Projection (P2) matrix, wherein the M2 and P2 matrices represent the desired final position of the augmentation information;
   estimate a number of frames to use for a transition;
   determine a transition matrix Mx and a transition matrix Px for each frame of the transition;
   display the augmentation information in each frame using the Mx and Px matrices;
   display the final frame using the M2 and P2 matrices; and
   execute an application associated with the object of interest.

5. The non-transitory computer-readable storage medium of claim 4 comprising instructions configured to cause at least one processor to determine the transition matrices Mx and Px based on an interpolation between M1 and M2, and P1 and P2 respectively.

6. The non-transitory computer-readable storage medium of claim 5 comprising instructions configured to cause at least one processor to utilize a linear interpolation method to determine the transition matrices Mx and Px.

7. The non-transitory computer-readable storage medium of claim 4 comprising instructions configured to cause at least one processor to display augmentation information that corresponds to a video patch of the object of interest.

8. The non-transitory computer-readable storage medium of claim 4 comprising instructions configured to cause at least one processor to display augmentation information that corresponds to an alpha blended mix of a video patch and augmentation of the object of interest.

9. An apparatus, comprising:
   a mobile device, comprising:
      a graphical display configured to display an object of interest; and a processor programmed with instructions to:
  display the object of interest on the mobile device;
  determine augmentation information including a Modelview (M1) matrix and Projection (P1) matrix associated with the object of interest;
  display the augmentation information on top of an image of the object of interest using the M1 and P1 matrices;
  calculate a second Modelview (M2) matrix and a second Projection (P2) matrix, wherein the M2 and P2 matrices represent the desired final position of the augmentation information;
  estimate a number of frames to use for a transition;
  determine a transition matrix Mx and a transition matrix Px for each frame of the transition;
  display the augmentation information in each frame using the Mx and Px matrices;
  display the final frame using the M2 and P2 matrices; and
  execute an application associated with the object of interest.

10. The apparatus of claim 9, wherein the processor is further programmed with instruction to determine the transition matrices Mx and Px based on an interpolation between M1 and M2, and P1 and P2 respectively.

11. The apparatus of claim 10, wherein the interpolation is selected from a group of methods consisting of linear, acceleration, deceleration, and a curve.

12. The apparatus of claim 9, wherein the processor is further programmed with instructions to display augmentation information that corresponds to a video patch of the object of interest.

13. The apparatus of claim 9, wherein the processor is further programmed with instructions to display augmentation information that corresponds to an alpha blended mix of a video patch and augmentation of the object of interest.

14. An apparatus, comprising:
  means for displaying an object of interest on a mobile device;
  means for determining augmentation information including a Modelview (M1) matrix and Projection (P1) matrix associated with the object of interest;
  means for displaying the augmentation information on top of an image of the object of interest using the M1 and P1 matrices;
  means for calculating a second Modelview (M2) matrix and a second Projection (P2) matrix, wherein the M2 and P2 matrices represent the desired final position of the augmentation information;
  means for estimating a number of frames to use for a transition;
  means for determining a transition matrix Mx and a transition matrix Px for each frame of the transition;
  means for displaying the augmentation information in each frame using the Mx and Px matrices;
  means for displaying the final frame using the M2 and P2 matrices; and
  means for executing an application associated with the object of interest.

15. The apparatus of claim 14, wherein the means for determining the transition matrices Mx and Px is based on an interpolation between M1 and M2, and P1 and P2 respectively.

16. The apparatus of claim 15, wherein the interpolation is selected from a group of methods consisting of linear, acceleration, deceleration, and a curve.

17. The apparatus of claim 14, further comprising means for displaying augmentation information that corresponds to a video patch of the object of interest.

18. The apparatus of claim 14, further comprising means for displaying augmentation information that corresponds to an alpha blended mix of a video patch and augmentation of the object of interest.

* * * * *